L. FRENCH.
Improvement in Land-Rollers and Harrows.

No. 130,710. Patented Aug. 20, 1872.

UNITED STATES PATENT OFFICE.

LEVIAS FRENCH, OF CRAWFORDSVILLE, IOWA.

IMPROVEMENT IN LAND ROLLERS AND HARROWS.

Specification forming part of Letters Patent No. 130,710, dated August 20, 1872.

*To all whom it may concern:*

Be it known that I, LEVIAS FRENCH, of Crawfordsville, in the county of Louisa and State of Iowa, have invented a new and valuable Improvement in Corn-Rollers and Harrow; and I do hereby declare that the following is a full, clear, and exact description of the construction and operation of the same, reference being had to the annexed drawing making a part of this specification, and to the letters and figures of reference marked thereon.

Figure 1:
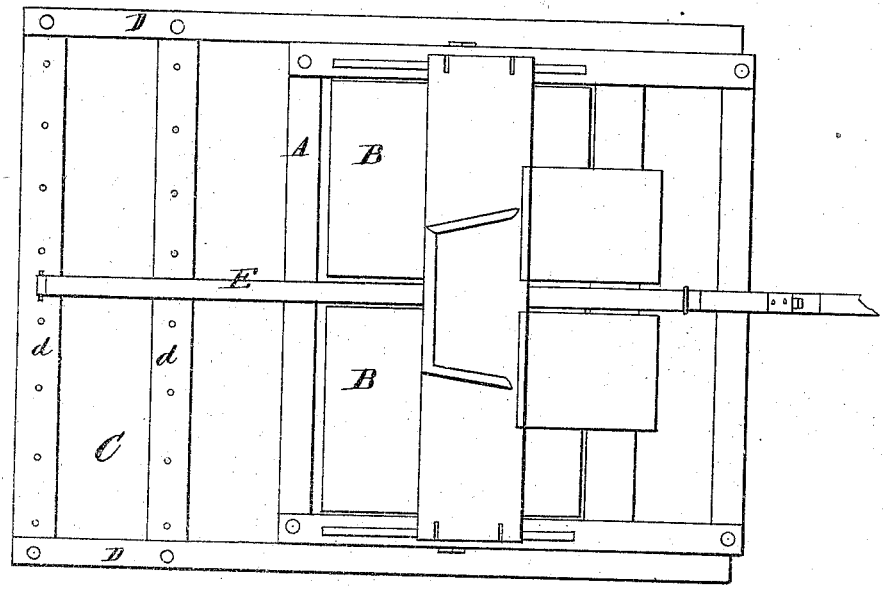
Figure 2:
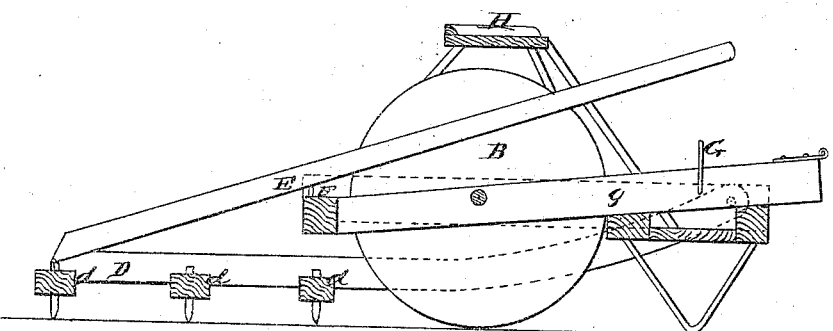

Figure 1 of the drawing is a representation of a plan view of my invention. Fig. 2 is a vertical longitudinal section of the same.

This invention has relation to land rollers and harrows; and the novelty consists in the novel construction and arrangement of the harrow-frame, rollers, and lever, for the purpose hereinafter described.

This implement is designed for use in rolling and pulverizing the soil soon after the planting of corn, and before it is sufficiently advanced for the work of the cultivator.

In the drawing, A represents a rectangular frame supported by two land-rollers, B, journaled between its side. C designates a harrow-frame having its side bars D extended forward, bent up, and hinged to the harrow-frame at the front end of the latter. The harrow-teeth are secured to the transverse bars *d*. E denotes a lever hinged to the rear end of the harrow, thence extending forward above the roller-frame and between the rollers and resting on a fulcrum, F. The harrow is raised by depressing the forward end of the lever. A hinged loop, G, attached to the draft-beam *g*, is capable of being placed over the end of the lever when the same is pressed down and serves to hold the harrow up.

In the operation of this implement the rollers move along on either side of a corn-row and crush the clods of earth. The harrow following rakes up the earth, leaving the plants untouched, kills the growing weeds, and so pulverizes and prepares the soil as to aid the growth of the corn.

H designates the driver's seat.

I do not claim, broadly, the combination of a roller and harrow, for I am aware that such implements are not new; but

What I claim as my invention, and desire to secure by Letters Patent, is—

The land roller and harrow herein described, consisting of the rollers B, pivoted harrow-frame C, bent side-bars D pivoted in front of rollers B, lever E, and locking-loop G, all constructed and arranged as and for the purpose set forth.

In testimony that I claim the above I have hereunto subscribed my name in the presence of two witnesses.

LEVIAS FRENCH.

Witnesses:
WALLACE ORR,
ALBERT WINCHESTER.